25890
June 11, 1963     G. A. McCAMMON     3,093,167
OFFSHORE COMBINATION SHIP MOORING AND SHIP
LOADING APPARATUS-BOW MOORING
Filed May 5, 1961     8 Sheets-Sheet 1
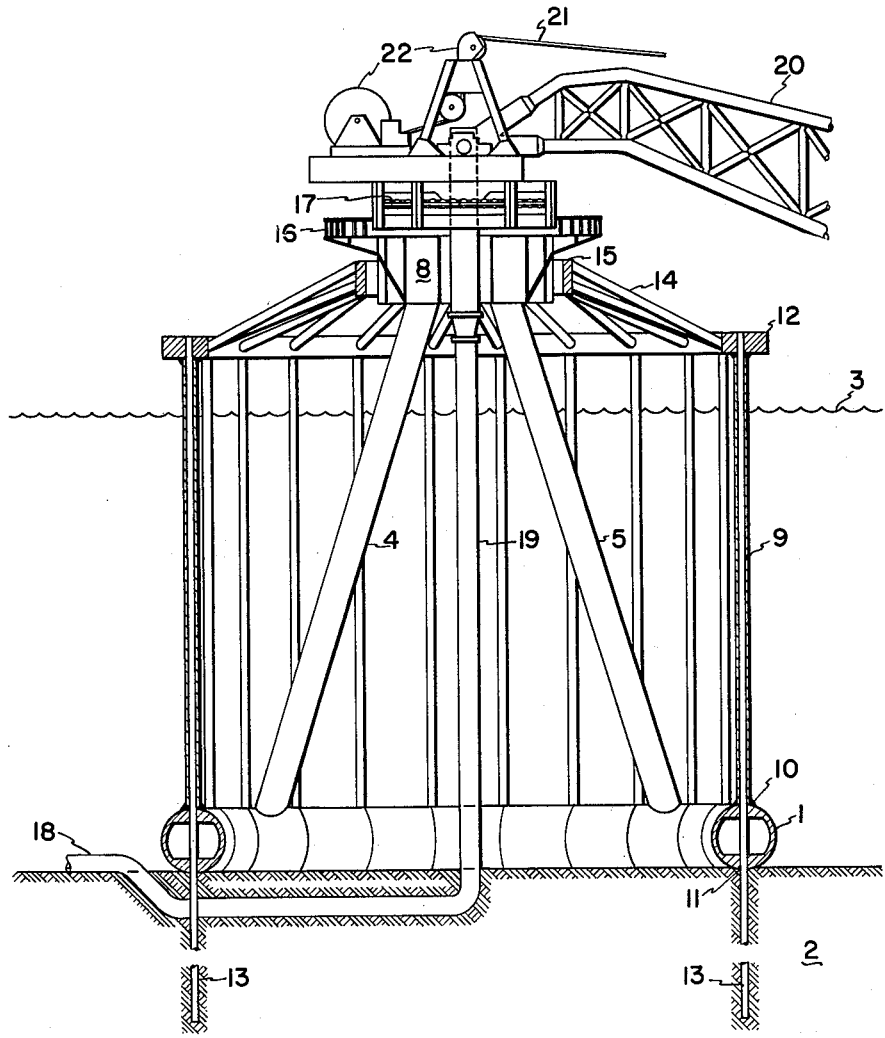
Fig. I
George A. McCammon    Inventor
By W. O. Heilman
Patent Attorney

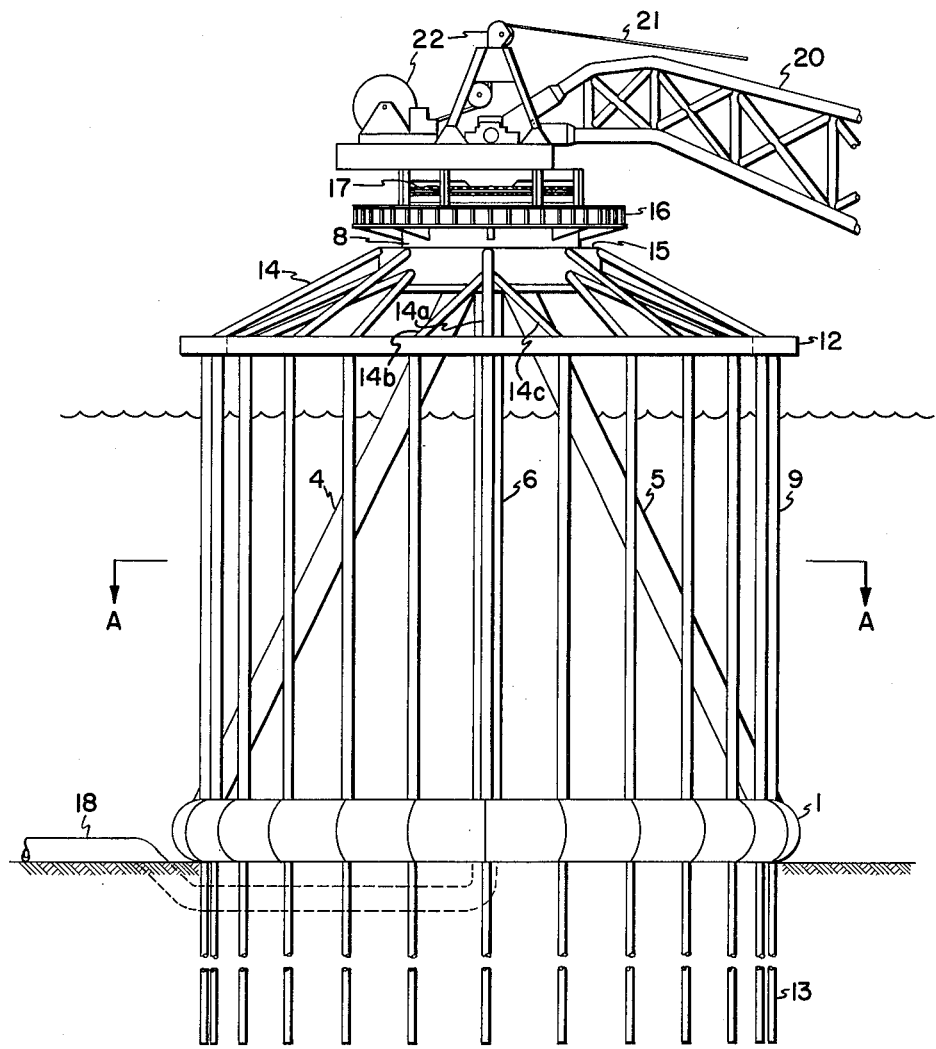
Fig. II
George A. McCammon    Inventor
By W. O. J Heilman
Patent Attorney

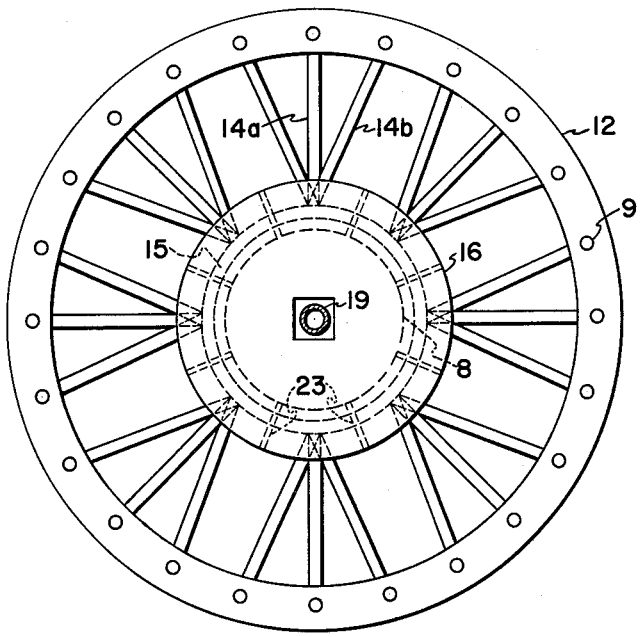
Fig. III
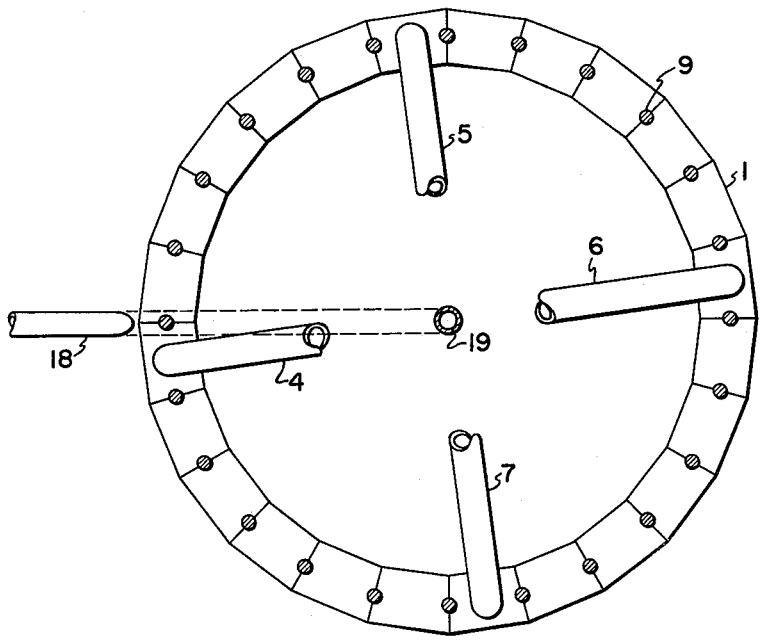
Fig. IV
George A. McCammon  Inventor
By W. O. Heilman
Patent Attorney

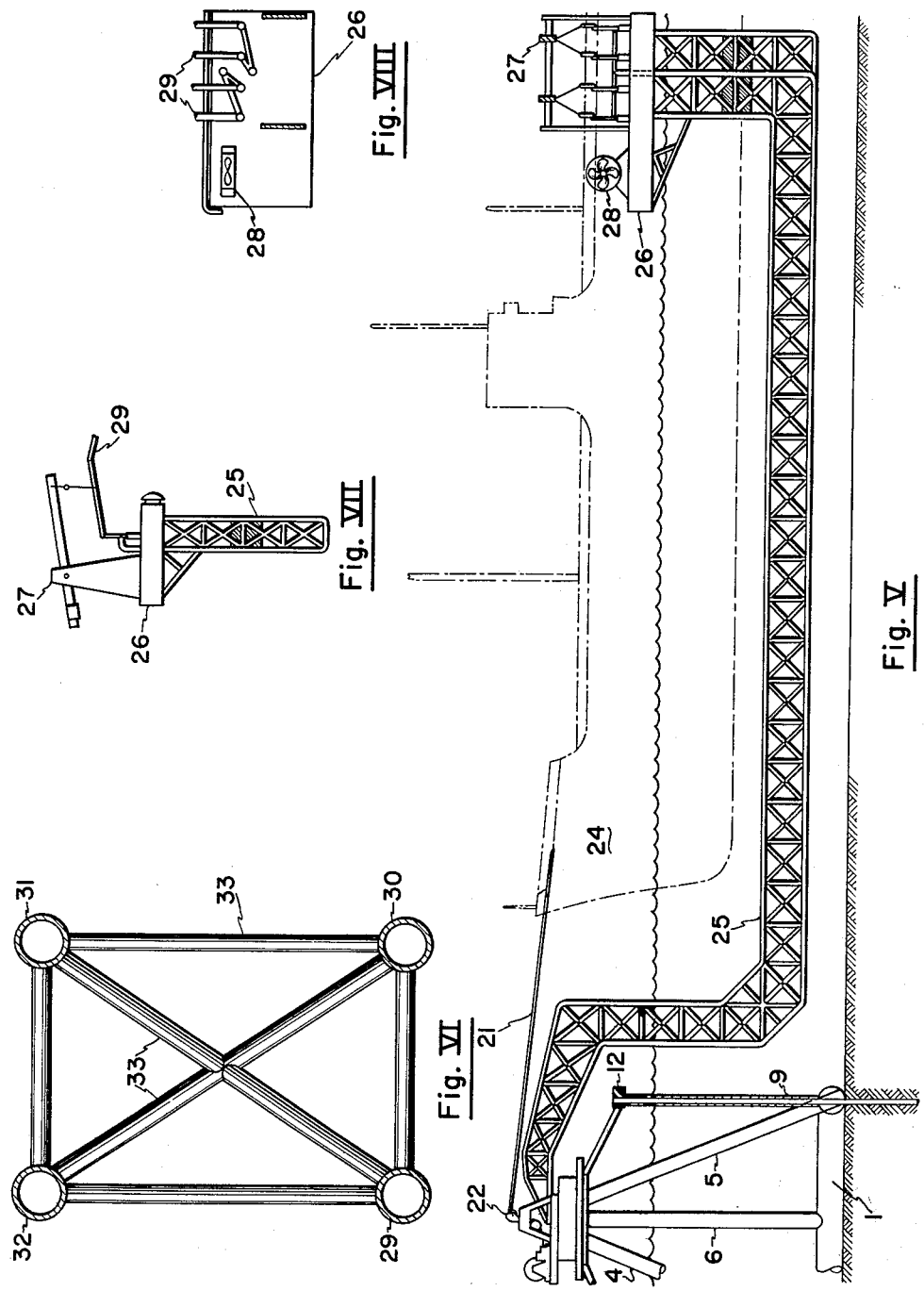

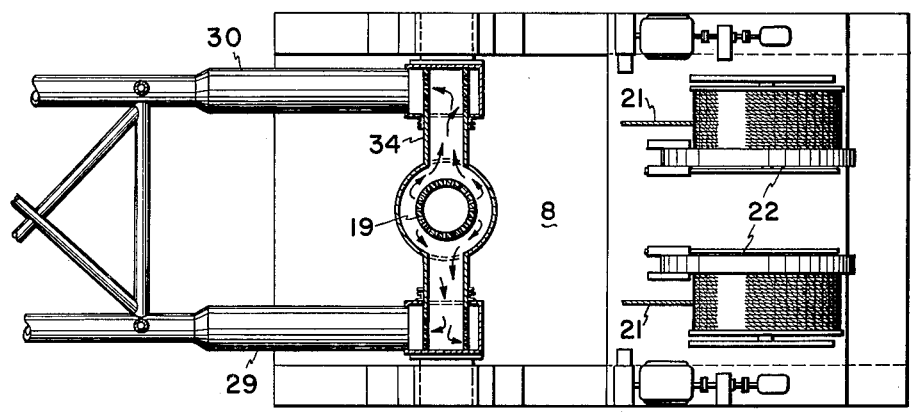
Fig. X
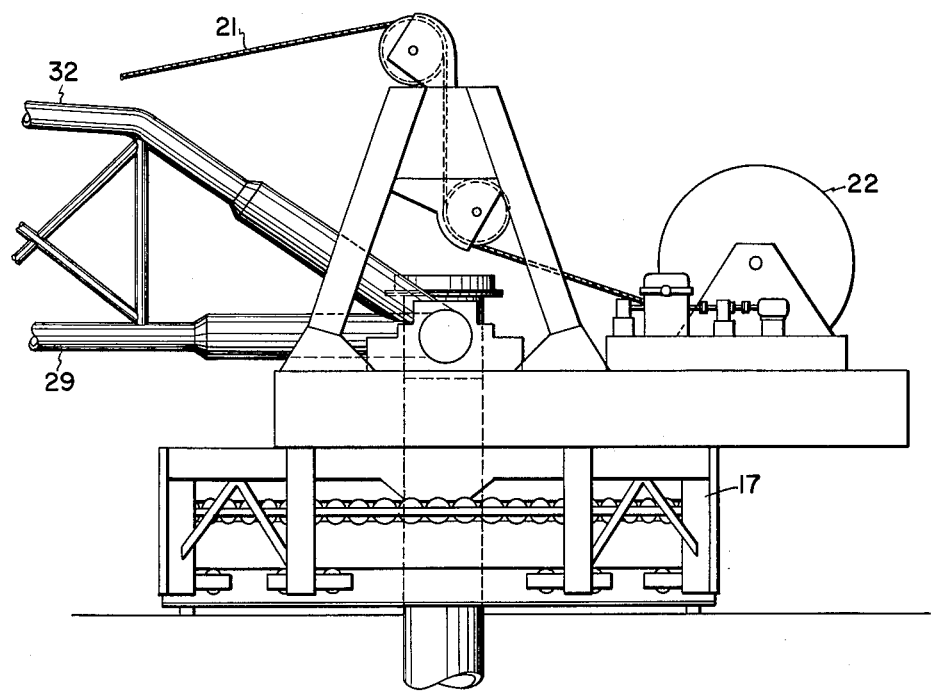
Fig. IX
George A. McCammon  Inventor
By W. O. Heilman
Patent Attorney

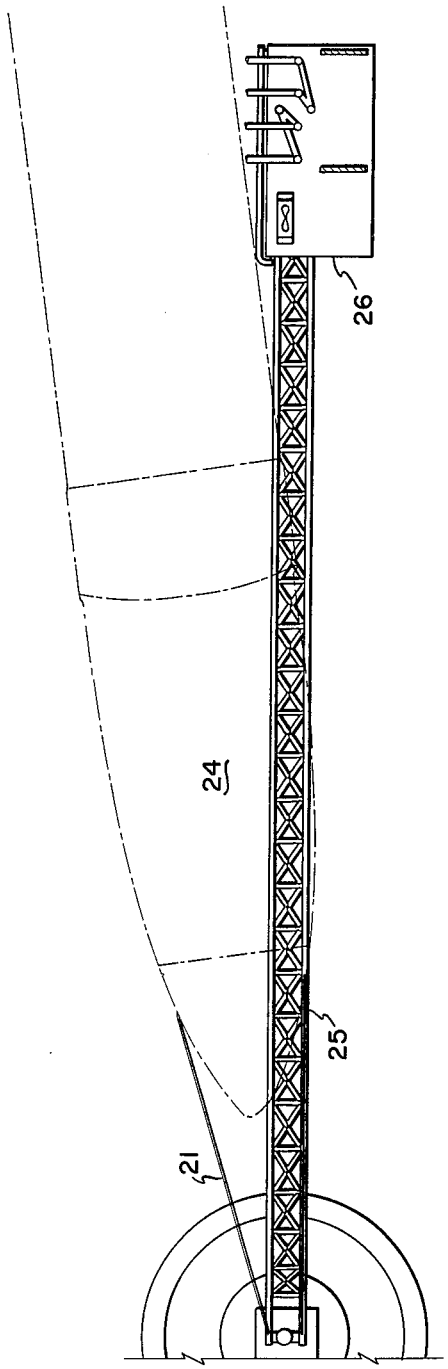

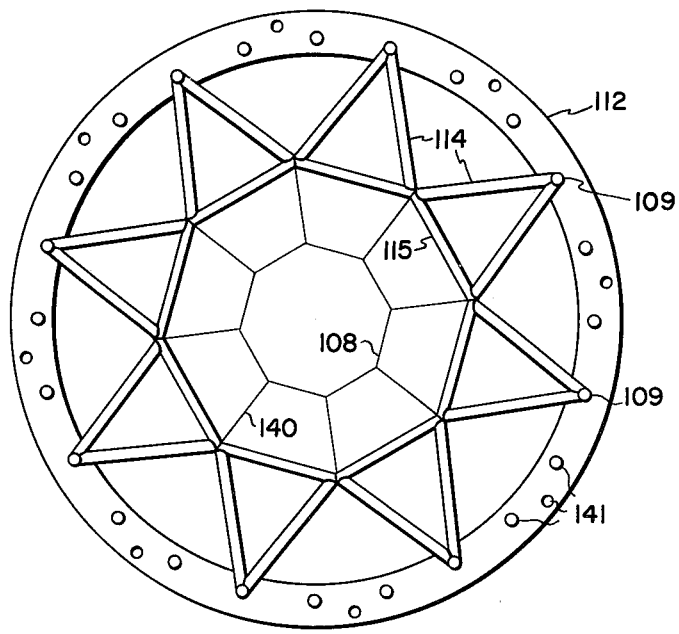
Fig. XII
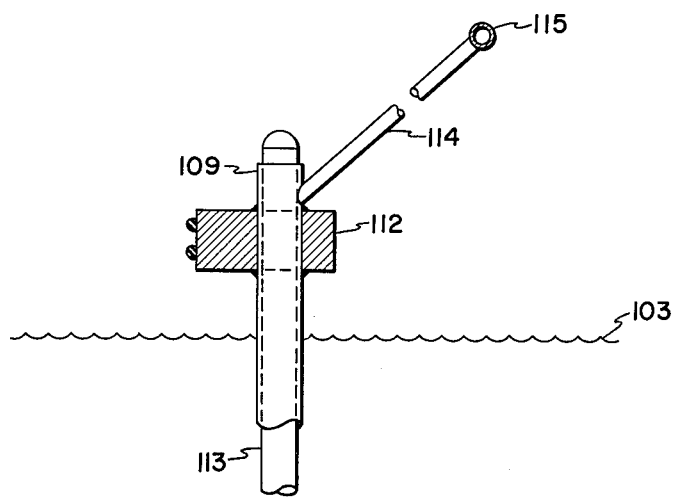
Fig. XIII
George A. McCammon Inventor
By
Patent Attorney

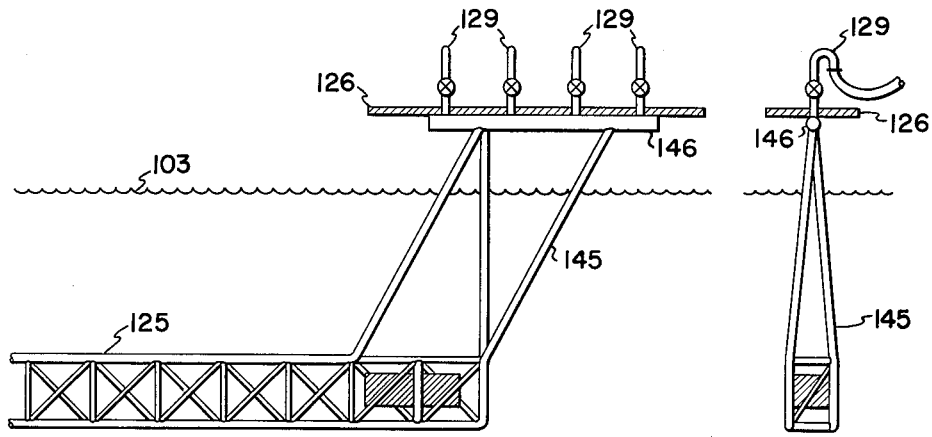
Fig. XIV   Fig. XV
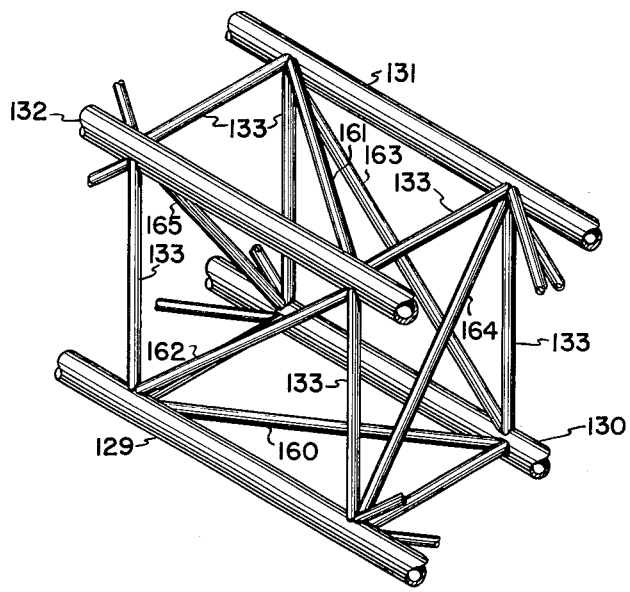
Fig. XVI
George A. McCammon   Inventor
By W. O. Heilman
Patent Attorney

United States Patent Office 3,093,167
Patented June 11, 1963

3,093,167
OFFSHORE COMBINATION SHIP MOORING AND SHIP LOADING APPARATUS-BOW MOORING
George A. McCammon, Tripoli, Libya, assignor to Esso Research and Engineering Company, a corporation of Delaware
Filed May 5, 1961, Ser. No. 108,156
6 Claims. (Cl. 141—387)

The present invention is concerned with an improved offshore ship mooring and ship loading device whereby ships and other vessels can be more effectively loaded and unloaded, particularly with fluids such as hydrocarbons, gasolines, crude oils and the like. In accordance with the present invention, a unique structure comprising a caisson or equivalent structure is positioned offshore and utilized in conjunction with a submerged boom to more effectively moor ships for the purpose of loading and unloading them. In accordance with a preferred adaptation, the boom is free to rotate about the structure or caisson and a preferred application of the structure is for the loading and unloading of tankers which will be bow moored to the caisson. Liquids, such as crude oil, are then delivered or unloaded to the amidships manifold of the vessel by pipelines or other conduits positioned inside the boom. The preferred structure of the present invention comprises, in essence, a flexible or pliable substructure used in conjunction with the submerged boom wherein said boom contains at its outboard end a buoyancy chamber or tank adapted to maintain substantially the same buoyancy of the boom as the ship or tanker being loaded or unloaded.

The rapid loading of marine equipment with liquid products as, for example, hydrocarbons and the like, has always presented a problem due to the continuous shifting of the marine equipment being loaded. This shifting of marine equipment is due to tidal variations, changes in the ship's draft during the loading operations and also wave and wind action. Thus, there exists the problem of continually adjusting the position of the loading hoses to compensate for these changes. Any appreciable change in the relative position of the loading hoses, unless corrected, will cause a severe strain on the tanker connections and, in many instances, cause them to break, thereby putting the tanker out of operation until repairs are effected. This is a very expensive operation. Other difficulties are encountered when attempting to moor ships in various areas due to wave, current and ocean bottom conditions. In order to overcome many of these difficulties, it is known in the art to load ships, such as oil tankers and the like, at piers in protected waters or at marine anchorages or at nose moorings in the open sea.

In the case of tankers at piers, the manifolds of tankers are connected to the pier piping by multiple hoses or flexible arms. In the case of marine anchorages, the tanker manifolds are connected to hoses attached to submarine lines. The number of hoses is limited by the necessity of laying them out on the ocean bottom so that they are not tangled. The hoses must be long, usually 200 feet or more, and the weight, and hence the diameter are limited by the capacity of the ship's gear. Marine anchorages are generally limited to one or two hose connections of 12" diameter or smaller. Tankers are sometimes moored by the bow with hoses extending from the mooring to the bow. However, few tankers have bow connections. On most other tankers, it is necessary either to lay a hose from the bow to the amidships manifold connections or use a floating hose alongside the vessel. The latter is subject to adverse wave and current actions.

The present invention, as pointed out heretofore, covers an improved offshore ship mooring and offshore ship loading device which is characterized in that the ship being loaded or unloaded, as well as the loading boom, will automatically adjust to the composite vector of tide, wind, sea and current as well as compensating for the changing buoyancy of the vessel during the loading and unloading operation. The present invention may be readily understood by reference to the drawings illustrating an embodiment of the same.

FIGURE I is a cross-sectional vertical view of the structure positioned on the ocean bottom showing the turntable and a portion of the boom. FIGURE II shows in detail the structure and the fendering system. FIGURE III is a top view of the fendering system while FIGURE IV is a top view through A—A of FIGURE II showing the lower donut ring. FIGURE V shows the apparatus and the outwardly extending boom, while FIGURE VI is a cross-sectional view of the boom. FIGURE VII is an end view of the boom and FIGURE VIII is a top view. FIGURE IX illustrates in some detail the turntable having mounted thereon the auxiliary equipment. FIGURE X is a top view of this auxiliary equipment. FIGURE XI is a top view of the boom, and of the vessel and the caisson structure. FIGURE XII is similar to FIGURE III which illustrates a preferred structure with respect to the box girder, the movable top ring and the rigid top platform. FIGURE XIII shows in some detail the structure and tie-in of the fendering box girder and the top ring. FIGURE XIV is somewhat similar to FIGURE V showing the submerged boom and a desirable way of supporting the loading platform. FIGURE XV is an end view of FIGURE XIV showing the method of supporting the loading platform to the submerged boom. FIGURE XVI shows in some detail the method of structurally supporting the submerged loading boom.

Referring specifically to FIGURE I, a lower base circular or donut ring 1 is shown positioned on the ocean floor 2 beneath the surface of the water or ocean 3. Extending upwardly and inwardly from lower base ring 1 are supporting legs 4 and 5 which extend above the surface of the water and are rigidly affixed at the upper ends thereof to a rigid top platform 8. Legs 6 and 7 are not illustrated in FIGURE I.

Extending upwardly from the bottom of lower base ring 1 are a plurality of fendering tubes 9. These tubes extend vertically upwardly and are positioned about the periphery of ring 1. These tubes are hollow and are welded to ring 1 or otherwise suitably attached at the top of the ring at points 10 and at the bottom of the ring at points 11. These tubes extend to a point above the level of the water and are attached at the upper ends thereof to a circular member, preferably a box girder 12.

In positioning the structure into place, the donut base ring with the fendering rings is positioned on the ocean floor. Piling members 13 are driven through each of hollow tubes 9 into the ocean floor. The box girder fendering ring 12 is attached to the upper ends of fendering tubes 9 and contains inwardly extending radial arms 14 which, in turn, are attached to a flexible or movable top ring 15. The rigid platform 8 has attached to it a turntable mechanism 17 which holds one end of the loading boom 20. This turntable holds the mooring lines 21 and auxiliary mooring equipment 22. A shore feeding line 18 extends from shore base tanks and leads into the vertical feed line 19 of the structure. It is to be noted with respect to FIGURE I that box girder 12 over-extends the vertical fendering tubes 9 so that if a ship nudges against member 12 and exerts a forward thrust thereon causing it to retract, the lower end of the bow of the ship will not make contact with the upwardly extending fendering tube.

Referring specifically to FIGURE II, similar elements as described in FIGURE I are similarly numbered. FIGURE II shows, in addition, the third inclined leg 6 of the four inclined legs of the structure which extend from the lower base ring 1 to the rigid top platform 8. The working platform 16, the movable top ring 15, the box girder 12 and the piling members 13 as well as the fender tubes 9 are illustrated. In FIGURE II, the structure of the radial arms 14 is illustrated in more detail. Extending inwardly from box girder 12 to the top edge of ring 15 is a radial member 14a. Also extending inwardly from box girder 12 are two radial arms 14b and 14c which are attached at the lower side of top ring 15 directly beneath the point of attachment of 14a.

Thus, in operation, if a ship to be moored nudges against box girder 12 thereby exerting a forward thrust on the girder, this thrust is resisted by bending fendering tubes 9 and the piling contained therein so as to cause ring 15 to move backwardly until the same makes contact with the rigid platform 8. While this distance may vary appreciably, it is preferred that the same be from 1 to 30 feet.

This method of attaching the radial arms from top ring 15 to box girder 12 is more clearly illustrated in FIGURE III wherein similar elements described in FIGURES I and II are similarly numbered. Referring specifically to FIGURE III, which is a top view of FIGURE II, fendering tubes 9 are shown attached to box girder 12. Box girder 12 is securely attached to top ring 15 by means of radial arms 14a, 14b, and 14c. Both top ring 15 and the rigid top platform 8 are positioned below working platform 16. Working platform 16 is attached to rigid top platform 8. The working platform 16 is supported by means of struts 23. A vertical feed line 19 is shown extending from the lower shore line 18. While only one shore feeding line 18 and one vertical feed line 19 are illustrated, it is to be understood that a plurality of lines may be utilized carrying different fluids.

FIGURE IV is a vertical view through A—A of FIGURE II. The inclined supporting legs 4, 5, 6, and 7 are shown rigidly attached to the lower base ring 1 and the shore feeding line 18 is shown in communication with the vertical feed line 19. The fendering tubes 9 are shown extending vertically upwardly from the lower base ring 1.

Referring specifically to FIGURE V, vessel 24 is shown moored to the structure of the present invention by means of mooring lines 21. The loading boom 25 extends substantially horizontally outwardly from the mooring structure, thence vertically downwardly to beneath the surface of the water, thence outwardly beneath vessel 24 to the mid-ship loading connections. At this point, the loading boom extends vertically upwardly to a loading platform 26 positioned above the water, and adjacent to the mid-ship loading connections or manifold. The outboard end of the boom 25 contains a buoyancy tank 27 by which the buoyancy of the outboard end of the boom may be adjusted as a function of the buoyancy of vessel 24 as it is being loaded or unloaded. Loading platform 26 comprises suitable hose handling equipment 27 as well as means 28 for maintaining the boom at the desired position with respect to the vessel being loaded. This means preferably comprises a fan or propeller which is operated to give the desired thrust of the boom against the vessel being loaded.

FIGURE VI is a cross-sectional view of boom 25 containing conduits 29, 30, 31, and 32. These spaced conduits or loading lines are rigidly supported by means of cross-sectional members and other struts 33. In actual operation, two conduits 31 and 32 may comprise an air conduit for pressuring the buoyancy tank, and conduits 29 and 30 for the product or hydrocarbon being loaded or unloaded.

FIGURE VII is an end view of the outboard end of the boom 25 showing platform 26 positioned on the top of boom 25. The platform 26 contains the hose handling equipment 27 and shows a loading line 29 which is attached to the mid-ship loading connection.

FIGURE VIII is a top view of the platform, again showing in some detail the spacing of the propeller and the loading lines. FIGURE X is a top view of FIGURE I showing the inboard end of the boom attached to the rigid platform 8. Hydrocarbons, for example, are pumped up through the swivel line 19 through two swivels 34, thence into loading lines 30 and 29 which are connected as hereinbefore described to the mid-ship loading connections. The turntable is free to swing, only power is the fan on the outer end of the arm.

FIGURE IX is a side view of the boom at its inboard end showing loading lines 29 and 32 extending outwardly to the mid-ship loading connections. This equipment is shown positioned on turntable 17 and illustrates the mooring line handling equipment 22. FIGURE XI is a top view showing the vessel 24 moored to the structure by means of mooring lines 21 and the loading boom 25 extending outwardly and beneath the vessel to the mid-ship loading connections.

The present invention is broadly concerned with an improved structure for the mooring and for the loading and unloading of vessels offshore. The structure, in essence, consists of a donut shaped ring positioned on the ocean floor containing a plurality of vertical fendering tubes which extend above the surface of the water. Piling is installed through these tubes into the surface of the ocean. Inclined leg members extend upwardly from the donut ring to a rigid top platform positioned above the surface of the water. The fendering system consists essentially of the upwardly extending fendering tubes which, in turn, are attached to a circular fendering ring positioned above the water. It is against this ring that the ship will make contact. This fendering ring is rigidly attached to a smaller top ring, which top ring is at a position higher than the fendering ring. The top ring is positioned about the periphery of the rigid platform. Thus when a ship makes contact against the fendering ring, the entire structure including the fendering tubes and the piling resists this thrust. The fendering ring causes the top ring to move backwards until the top ring contacts the rigid platform which prohibits further movement of the fendering system.

The ship then retreats against the recoil thrust of the fendering system and drops back upon its moorings at which time the boom is rotated in a position before the bow of the vessel. The boom is characterized by consisting of four conduits adapted to pass fluid to or from the tanker and is submerged beneath the tanker to the mid-ship loading manifold of the ship. The outboard end of the boom is characterized by a buoyancy tank which allows the outboard end of the boom to remain in the same vertical position with respect to the vessel as the vessel is being loaded or unloaded. A very unique feature of this structure comprises the preferred technique of maintaining the outboard end of the boom against the vessel which is an air propeller or fan.

While the dimensions may vary appreciably and will be inter-related, one satisfactory structure is to have the lower donut ring of a main overall diameter of about 120 feet center to center. The sectional diameter of this lower donut ring is approximately 12 feet and is constructed of 1" steel plate or equivalent metal. When the structure is in position at the ocean bottom, it is preferable to fill this lower donut ring with water or with solids and to cover the entire lower donut ring with aggregate in order to avoid scarifying action due to tides and currents.

The upwardly inclined legs are preferably 7 feet in diameter and may extend to a point around 35 feet above the water wherein they will be attached to the rigid platform. The upper rigid platform 8 may be 60 feet in diameter while fendering tubes 9 are approximately 30" in diameter. It is preferred that approximately 24 fendering tubes be utilized and that they extend approximately 10 feet above the water. In one apparatus, which may be positioned approximately 100 feet below the surface of the water, these tubes would be 110 feet long and it is preferred that they be made of about 100,000 pounds per square inch minimum yield steel. As pointed out heretofore, the distance between the upper ring 15 and the rigid platform 8 may vary from about 2 to 20 feet which means that this is the movement allowed in the fendering system.

The apparatus of the present invention is adapted to moor and load vessels of from 600 to 1000 feet in length, which vessels will have a free board from about 15 to 30 feet. A typical vessel comprises a 72,000 ton tanker of about 840 feet in length, wherein the distance to the midship loading line is 420 feet. Under a normal type of operation, the ship is moored from 100 to 200 feet away from the structure, preferably about 150 feet away from the structure. The radial arms extending from the fendering ring to the upper ring are preferably from 22 to 24″ in diameter. By inclining the supporting legs, the reactionary forces of the waves on the structure is minimized. The structure of the present invention permits a vessel to be loaded or unloaded with the waves up to 12 feet in height since the ship and the loading boom will assume the resulting vector of forces of the wind, the tide, and the current.

The structure of the present invention eliminates the necessity for the long loading hoses of 100 to 120 feet heretofore required, since the loading lines from the platform on the outboard end of the boom to the ship loading connections will be about from 30 to 50 feet in length. It is preferred that the fendering ring be suitably lagged with lagging or fendering rubber or equivalent in order to minimize wear. It is also preferred that the piling driven through the fendering tubes extend above 50 feet below the surface of the sea. In general, it is preferred that, when the fendering tubes are 30″ in diameter, the piling be about 27″ in diameter.

A preferred structure with respect to the tie-in of the box girder with the movable or top ring 15 is illustrated in FIGURE XII. The box girder 112 contains apertures 141 which allow sea water to flow downwardly therethrough and minimize certain wave forces. The flexible top ring 115 is in the form of an octagon wherein each corner of the octagon is connected by means of structural members 114 to fendering tubes 109 which extend through the girder 112. In turn, the rigid top platform 108 is also in the form of the octagon, which platform is affixed to each corner of the octagonal top ring 115 by means of hydraulic braking rams 140. These hydraulic braking rams may be adjusted to progressively resist the oncoming thrust of a vessel so as to insure that the flexible top ring 115 will never contact rigid platform 108. Details of the structure are shown in FIGURE XIII showing piling members 113 within fendering tubes 109. It is to be noted that the box girder fendering ring 112 protrudes outwardly from the fendering tubes appreciably and contains on the outer edge thereof, a plurality of fendering or buffeting materials. Thus, if the ship should thrust against ring 112 due to the structure, the bow of the ship will never make contact with the fendering tubes 109 as they are bent inwardly under the thrust of the vessel. It is to be understood that, in normal operations, the ship will not contact the fendering ring but will lie away from the entire structure which will automatically adjust itself with the ship under the influence of wind, tide and current.

A preferred method of attaching the loading platform to the submerged boom is illustrated in FIGURE XIV showing the loading platform 126 extending outwardly from the submerged boom 125 and containing loading means 129 which, in essence, comprises gooseneck members and ship sections of loading hose. The platform 126 is preferably rigidly attached by means of a single structural member 146 extending its entire length, which single structure member is then attached to the submerged boom 125 by means of a plurality of structural members 145.

A preferred method of structuring the submerged loading boom is illustrated in FIGURE XVI wherein conduits 129, 130, 131 and 132 are rigidly attached one to each other. At one end of the section, conduits 129 and 132 are attached. FIGURE XVI illustrates one section of the submerged boom which may comprise any number of similar sections. Conduits 129 and 132 are rigidly attached to each other at each end of the section by means of vertical struts 133. Similarly, conduits 131 and 130 are rigidly attached to each other at each end of the section by vertical struts 133. In a similar manner, conduit 129 is rigidly attached to 130 and conduits 132 to 131 at each end of the section by horizontal struts 133. However, a diagonal cross strut 160 at the bottom of the section is provided to further strengthen the section. A second cross strut 161 opposite in direction to the lower cross strut 160 is provided at the top of the section. A vertical cross strut is provided at one side of the section connecting conduits 129 to 132 which is opposite in direction to a second vertical cross strut 163 at the other side of the section which rigidly attaches conduits 130 and 131. In a similar manner, at one end of the section, a cross strut 164 rigidly attaches conduits 131 to 129 whereas at the other end of the section, a second cross strut 165 opposite in direction to cross strut 164 rigidly attaches conduits 130 to 132.

What is claimed is:

1. Improved ship mooring and ship loading structure which comprises in combination (1) a lower base donut ring adapted to be positioned on the ocean floor, (2) supporting legs affixed to said donut ring and extending upwardly and inwardly from said donut ring to a point above the surface of the water, (3) a top rigid platform supported above the water by said supporting legs, (4) fendering tubes extending upwardly from said donut ring and positioned about the periphery of said donut ring to a point above the surface of the water, (5) a fendering ring rigidly attached at the upper ends of said fendering tube, (6) a top ring positioned within and above said fendering ring and rigidly attached to said fendering ring by means of structural members, said top ring being positioned about said rigid top platform, (7) a turntable mechanism positioned on said rigid top platform and adapted to rotate with respect thereto, (8) an outwardly extending boom, the inboard end of which is rigidly attached to said turntable mechanism, said boom being characterized by an inboard section which is above the surface of the water and which extends to a point without said fendering ring, said boom being characterized by a middle section which extends downwardly to below the surface of the water, said boom being characterized by an outboard section one end of which is attached to the lower end of said middle section and which extends outwardly below the surface of the water to the loading manifold of a moored ship, (9) a loading platform affixed to the outboard end of said boom by means of upwardly extending structural members and positioned above the surface of the water adjacent the loading manifold of a moored ship, (10) mooring lines affixed to said turntable mechanism and adapted to rotate therewith, said mooring lines extending outwardly and adapted to moor a ship, (11) loading lines extending from shore facilities to within said lower base donut ring upwardly to said turntable mechanism and outwardly through said boom to said manifold of a moored ship whereby as tide, wind and current change the position of a moored ship, said boom will adjust in relation thereto.

2. Apparatus as defined by claim 1 wherein piling means are passed through said fendering tubes, through said lower base donut ring and into the ocean floor.

3. Apparatus as defined by claim 2 wherein said top ring is attached to said rigid platform by means of hydraulic dampeners which will function to resist the movement of said top ring in the direction of said rigid platform.

4. Apparatus as defined by claim 1 wherein a buoyancy tank is positioned at the outboard section of said boom so as to adjust the upward section of said boom, conduits to said buoyancy tank to adjust the buoyancy thereof and the buoyancy of said boom so as to conform with the buoyancy of a moored ship as it is being loaded or unloaded.

5. Apparatus as defined by claim 1 wherein said loading platform contains a suitably mounted fan which is adjusted to maintain said loading platform against a moored ship.

6. Apparatus as defined by claim 1 wherein at least two horizontal members of the boom comprise loading conduits.

References Cited in the file of this patent

UNITED STATES PATENTS

| | | |
|---|---|---|
| 2,731,168 | Watts | Jan. 17, 1956 |
| 2,818,891 | Loeser | Jan. 7, 1958 |
| 2,894,268 | Griebe | July 14, 1959 |
| 2,948,306 | Kuraeff | Aug. 9, 1960 |
| 2,955,626 | Hartley | Oct. 11, 1960 |